United States Patent [19]

Owen

[11] 4,128,789
[45] Dec. 5, 1978

[54] METHOD OF OPERATING GASEOUS DISCHARGE LAMPS

[75] Inventor: Daniel V. Owen, East Flat Rock, N.C.

[73] Assignee: General Electric Company, N.Y.

[21] Appl. No.: 701,333

[22] Filed: Jun. 30, 1976

[51] Int. Cl.² ............... H05B 37/02; H05B 39/04; H05B 41/36
[52] U.S. Cl. .................... 315/209 R; 313/220; 313/228; 315/107; 315/105
[58] Field of Search ............ 315/209, 105, 225, 47, 315/107; 313/220, 228, 229

[56] References Cited

U.S. PATENT DOCUMENTS

| | | | |
|---|---|---|---|
| 3,707,649 | 12/1972 | Kottenstette | 315/239 |
| 3,906,302 | 9/1975 | Wijsboom | 315/209 |
| 4,004,185 | 1/1977 | Edmondson et al. | 315/105 |

Primary Examiner—Saxfield Chatmon, Jr.
Attorney, Agent, or Firm—Sidney Greenberg

[57] ABSTRACT

Gaseous discharge lamps of high pressure sodium vapor type having an arc tube containing a mixture of sodium vapor and another metal vapor are operated with unidirectional current (DC) pulses in a manner to avoid color separation of the light due to segregation of the atoms of the different metal vapors. The DC pulses are applied to the lamp with repetition rates of from about 50 Hertz to about 23,000 Hertz and a duty cycle of from about 8% to about 80%.

8 Claims, 4 Drawing Figures

METHOD OF OPERATING GASEOUS DISCHARGE LAMPS

The present invention relates to a method for operating gaseous discharge lamps and is particularly concerned with an improved method for operating such lamps incorporating a filling of mixed metal vapors including sodium vapor.

While AC operation of such gaseous discharge lamps has been generally used in the past in roadway and area as well as indoor lighting applications, it is known that the use of unidirectional current (DC) affords certain advantages, such as the possibility of using smaller and less expensive ballast components which produce less noise, and prolonging the life of the lamp. A difficulty, however, in using unidirectional current for operating lamps having a mixture of metal vapors is that in such operation, the phenomenon of color separation occurs. This effect apparently is caused by one of the gases, i.e., the sodium vapor, becoming ionized and migrating in the DC field to the cathode of the lamp arc tube while the other gas ions migrate to the anode, thus resulting in a different colored light appearing at one end of the lamp as compared to the light at the other end. This effect is undesirable for several reasons. For one thing, the overall color of the lamp changes, and the lamp color may therefore be different from the color of adjacent lamps. Further, different colored illumination may appear on the working area. Also, lamp efficacy in terms of lumens per watt becomes substantially lower with such color separation, with a loss of 40-50% being typical. Moreover, the useful life of the lamp is reduced due to blackening of the arc tube at the region of color separation, which also leads to an undesirable increase in arc voltage due to the blackening.

It is an object of the invention to provide a method for DC operation of gaseous discharge lamps of the above type which avoids the above-mentioned disadvantages.

It is a particular object of the invention to provide pulsed DC operation of such gaseous discharge lamps in a manner to avoid color separation therein and without significant loss in lamp efficacy or reduction of lamp life.

Still another object of the invention is to provide such pulsed DC operation of gaseous discharge lamps while avoiding extinguishing of the lamp between pulses.

Another object of the invention is to provide a method of the described type which may be employed for operating gaseous discharge lamps of standard, commercially available type.

Other objects and advantages will become apparent from the following description and the appended claims.

With the above objects in view, the present invention in one of its aspects relates to a method of operating a high pressure sodium vapor gaseous discharge lamp having a filling comprising a mixture of sodium vapor and at least another metal vapor within an elongated envelope provided with spaced electrodes, wherein during DC operation of the lamp the sodium vapor becomes ionized and the sodium ions migrate toward one of the electrodes away from the other metal vapor, which method comprises energizing the gaseous discharge lamp by electrical pulses having a unidirectional current wave form such as to permit the migrated sodium ions to re-diffuse with the other metal vapor, whereby separation of color in the lamp and efficacy loss in the lamp due to such migration are avoided.

In a typical case, the gaseous discharge lamp employed in practicing the present invention is a high pressure sodium vapor lamp containing mercury mixed with sodium in the arc tube, these lamps being of the type available commercially under the trademark LUCALOX. Such lamps are disclosed in detail in Schmidt U.S. Pat. Nos. 3,248,590 and 3,384,798 and in Hanneman U.S. Pat. No. 3,521,108. In the co-pending application of Osteen, Ser. No. 649,900, filed Jan. 16, 1976 and assigned to the same assignee as the present invention, there is disclosed a method and system for improving the color rendition of such lamps by pulsed operation, wherein pulses within a certain range of repetition rates and duty cycle provide for the desired improvement in the color (color temperature) of the lamp. The apparatus and circuit disclosed in the Osteen application may be employed in practicing the present invention, and accordingly the disclosure thereof is incorporated herein by reference. The present invention, in distinction to the Osteen invention, is based on the discovery that pulsed DC operation of high pressure sodium vapor lamps of the type described unexpectedly prevents the separation of color in such lamps which had usually occurred when these lamps were operated under unidirectional current as heretofore applied.

The invention will be better understood and other advantageous features thereof will become apparent from the following description taken in conjunction with the accompanying drawing, in which.

Figure 1:
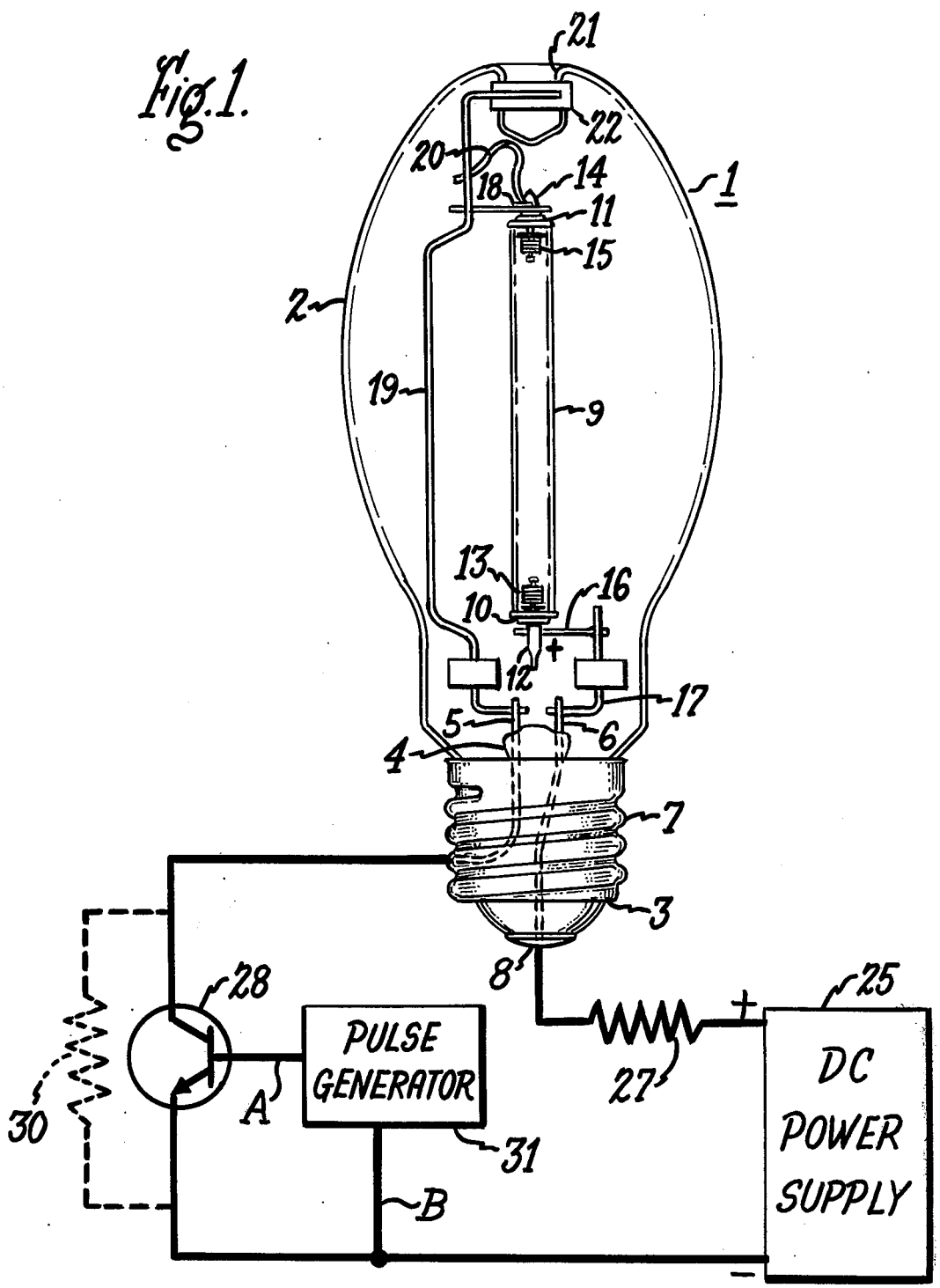
FIG. 1 is a side view of a gaseous discharge lamp with associated operating circuit which may be employed in practicing the present invention.

Referring now to the drawing, and particularly to FIG. 1, there is shown a gaseous discharge lamp associated with an operating circuit by means of which pulsed DC operation of the lamp can be provided in accordance with the invention. Lamp 1 is typically a 250 watt high pressure gaseous discharge lamp containing a mixture of sodium and mercury, but it will be understood that the lamp may contain additional metals and be manufactured in a variety of ratings from 70 to 1,000 watts. Lamp 1 comprises an outer envelope 2 of glass having a threaded metal base 3. Within outer envelope 2 is glass stem 4 through which extend a pair of relatively heavy lead-in conductors 5 and 6 having outer ends respectively connected to screw shell 7 and bottom base contact 8. Arc tube 9 extending axially within outer envelope 2 comprises a light transmitting elongated ceramic tubing composed essentially of alumina. Tube 9 has metal closures or caps 10 and 11 sealed to its opposite ends. End cap 10 has sealed therein metal tube 12 which provides a passage for exhaust and fill operations during manufacture of the lamp. Exhaust tube 12 is sealed off at its outer end and serves as a reservoir in which sodium metal or sodium mercury amalgam condenses during operation of the lamp. Electrode 13 within lamp 1 is attached to the inward projection of exhaust tube 12, and a dummy exhaust tube 14 extending through end cap 11 supports the other electrode 15. By way of example, arc tube 9 contains a filling of xenon at a pressure of about 30 torr to serve as a starting gas and a charge of 25 milligrams of amalgam of 25% by weight of sodium and 75% by weight of mercury.

Exhaust tube 12 is electricaly connected by conductor 16 and support rod 17 to lead-in conductor 6 which provides circuit continuity to base contact 8. Dummy exhaust tube 14 extends through ring support 18 fastened to side rod 19 which provides lateral restraint while allowing axial expansion of arc tube 9. One end of rod 19 is connected to lead-in conductor 5, and flexible metal strap 20 connects tube 14 to rod 19 to provide circuit continuity from electrode 15 to screw shell 7. The opposite end of side rod 19 is secured to inverted nipple 21 in the dome end of outer envelope 2 by clip 22.

In accordance with the present invention, it has been found that color separation in the lamp may be effectively avoided or substantially diminished by operating the lamp by DC electrical pulses wherein the pulses have repetition rates of from about 50 Hertz to about 23,000 Hertz and a duty cycle from about 8% to as high as 80%. Preferably, the pulses produce approximately the rated power input of the lamp, in order to avoid reduced lamp life and efficacy.

Figure 2:
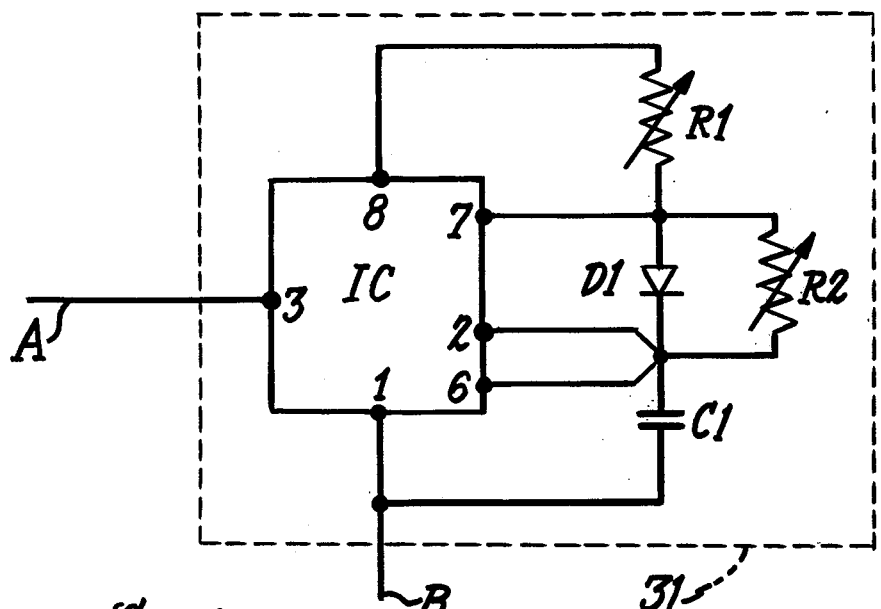
FIG. 2 is a circuit diagram of a pulse generator device which may be employed in the FIG. 1 circuit.

Such pulses may be provided by the operating circuit shown in FIG. 1. The DC power supply 25 shown may comprise a full wave rectifier and filter energized from a 240 volt, 60 cycle alternating current sources through a variable transformer as disclosed in the aforementioned co-pending Osteen application. Lamp 1 is connected in series with a resistive ballast 27 and an electronic switch 28 across the DC supply with the polarity indicated. Resistor 27 is selected to provide the desired peak current. While a resistive ballast is illustrated, it will be understood that the ballast may be an inductor, such as conventionally employed in operating gaseous discharge lamps, and a starting aid circuit may be employed therewith, as for example the type disclosed in Nuckolls U.S. Pat. No. 3,917,976. Electronic switch 28 is depicted as a simple transistor having its emitter-collector path connected in series with lamp 1 and its base supplied with control signals. However, any suitable electronic equipment capable of turning on and shutting off current flow from DC supply 25 in a controlled manner may be used. Pulse generator 31, which may be of any suitable known type such as shown in detail in FIG. 2, is connected to transistor 28 to supply pulses thereto for turning the switch on. During the time interval while transistor 28 is on, the voltage of supply 25 is applied across the lamp and ballast combination. The equipment permits the pulse frequency or pulse repetition rate, the pulse duration and the pulse amplitude to be controlled at will.

As seen in FIG. 2, the pulse generator comprises an integrated circuit IC such as a type NE555 available from Signetics Corporation. The integrated circuit consists of a bistable circuit whose output is either high (near positive power supply voltage) or low (near common or negative power supply voltage). The circuit is triggered into the high state when the voltage at the "trigger" (pin 2) goes below $\frac{1}{3}$ V where V is the power supply voltage. The circuit is triggered into the low state when the voltage at the "threshold" (pin 6) goes above $\frac{2}{3}$ V. The "discharge" (pin 7) exhibits a short circuit to power supply common when the circuit is in the low state. Pin 8 is the positive power supply input, pin 1 is the power supply common (negative) voltage, and pin 3 is the output voltage.

Variable resistor R1 is adjustable to obtain the desired pulse "on" time, with a higher resistance being used for producing a wider pulse, and a lower resistance for a narrower pulse. Variable resistor R2 is adjustable to obtain the desired pulse "off" time, with a higher resistance being used for producing a greater "off" time. It will be evident that control of pulse repetition rate and pulse duty cycle may be obtained by suitable adjustment of either resistor R1 or resistor R2, or both, as appropriate.

In the operation of the FIG. 2 circuit, in which pins 2 and 6 are both connected to timing capacitor C1, when the voltage on timing capacitor C1 goes higher than $\frac{2}{3}$ V, the "threshold" input (pin 6) will cause the output (pin 3) to go low and the "discharge" output (pin 7) to go low. When the voltage on the timing capacitor goes below $\frac{1}{3}$ V, the "trigger" input (pin 2) will cause the output to go high, and the discharge output to turn off. The operation, then, is as follows. Assume that the voltage on C1 has dropped to $\frac{1}{3}$ V. The output is then high, and the discharge output (pin 7) is turned off. Then C1 will charge through resistor R1 and diode D1 with a time constant R1C1. When the voltage on C1 reaches $\frac{2}{3}$ V, the output will go low and the pin 7 will go low. This will discharge C1 with a time constant R2C1. When the voltage on C1 reaches $\frac{1}{3}$ V, the cycle begins again.

It has been observed, in general, that the higher the length to diameter ratio of the lamp arc tube, the greater the color separation effect when the lamp is operated under the same conditions of pulse duty cycle and repetition rate. It appears that substantial problems of color separation are encountered in lamps of the above described type where the ratio of arc tube length to diameter is about 8 or higher.

Figure 3:
FIG. 3 is a graph illustrating a type of current wave form of DC pulses which may be employed in practicing the invention.

In an illustrative method carried out in accordance with the invention a 250 watt Lucalox lamp was used having a mixture of sodium and mercury, such as described above. The arc tube of the lamp was 3.34 inches in length and 0.27 inch in diameter. A pulsed DC current was applied to the lamp using a circuit such as shown in FIG. 1, wherein the pulse generator served to provide pulses of desired width and repetition rate. The pulses applied in this example were of square wave form with no holding current between pulses, as shown schematically in FIG. 3. The pulses had a duty cycle of 20% and a repetition rate of 1000 Hertz. Under these conditions, no color separation was observed in the lamp. At the same time, the color improvement in the lamp as described in the aforementioned Osteen application was obtained.

When pulse repetition rates of about 400 Hertz or less are employed, it is usually desirable to provide a holding current of about 10 to 200 milliamperes to ensure that the arc is maintained and the lamp remains illuminated. The amount of holding current employed will in general depend on the duty cycle of the applied pulses, that is, the lower the duty cycle, the higher the holding current provided, and vice versa.

Figure 4:
FIG. 4 is a graph illustrating another type of DC pulse wave form characterized by a holding current between pulses which may be employed in accordance with the invention.

To provide such a holding current, a resistor 30 may be connected across transistor 28 as illustrated in interrupted lines in FIG. 1. During the time intervals when transistor switch 28 is off, resistor 30 supplies lamp 1 with a holding current, the level of current depending on the value of resistor 30. FIG. 4 shows a typical pulse wave form characterizing a circuit which provides a holding current. A holding current will not normally be necessary at the higher levels of pulse repetition rates, but the upper limit of pulse repetition rate used should be such, for a particular pulse width, that a sufficient time interval between pulses is provided to permit re-diffusion of the migrated gas ions as described previously.

It has been found that when 18% or more of the lamp power is provided by the holding current, the correlated color temperature is below 2300° K.

In a procedure in which a holding current was used in conjunction with a low duty cycle, a 150 watt sodium vapor lamp of the described type was operated on DC pulses at a rate of 800 Hertz and a duty cycle of 8.5%. In this case, a holding current of 1.3 amperes was used which supplied about 54% of the power to the lamp. The color separation in the lamp was substantially reduced by this procedure, as compared to operation under continuous DC, but the color temperature was about 2150° K.

It has been observed in general that where a duty cycle of less than about 20% is used, a relatively high holding current should be applied, but it is preferred that the holding current not exceed about 50% of the power to the lamp.

In another example of the method of the invention, a 250 watt lamp of the above-described sodium vapor type was operated by DC pulses at a pulse repetition rate of about 23,000 Hertz and a 50% duty cycle, with no holding current being used. Substantial reduction in color separation was observed in the lamp, as compared to that produced under continuous DC operation.

In still another example, a similar 250 watt lamp was operated with DC pulses at a pulse repetition rate of 1000 Hertz and a duty cycle of 80%, no holding current being supplied. Here also the color separation in the lamp was markedly reduced in comparison to that observed under continuous DC operation.

In another illustrative method using a low pulse repetition rate, a 250 watt sodium vapor lamp of the described type was operated with DC pulses at a rate of 50 Hertz and a 30% duty cycle, using a holding current of 240 milliamperes. In this case, practically no color separation was observed in the lamp.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A method of operating a high pressure sodium vapor gaseous discharge lamp having a filling comprising a mixture of sodium vapor and at least another metal vapor within an elongated envelope provided with spaced electrodes, wherein during DC operation of the lamp said sodium vapor becomes ionized and the sodium ions migrate toward one of said electrodes away from the other metal vapor, which method comprises energizing said gaseous discharge lamp by electrical pulses having a unidirectional current wave form with a sufficient time interval between pulses to permit said migrated sodium ions to re-diffuse with said other metal vapor, whereby separation of color in the lamp and efficacy loss in the lamp due to said migration are avoided.

2. A method as defined in claim 1, wherein said filling mixture is contained in an arc tube having a ratio of length to diameter of at least about 8.

3. A method as defined in claim 1, wherein said pulses have a repetition rate in the range of about 50-23,000 Hertz.

4. A method as defined in claim 3, wherein said pulses have a duty cycle in the range of about 8-80%.

5. A method as defined in claim 1, wherein a unidirectional holding current is provided between said pulses.

6. A method as defined in claim 5, wherein said pulses have a repetition rate of less than about 400 Hertz and said holding current is in the range of about 10-200 milliamperes.

7. A method as defined in claim 5, wherein said holding current amounts to about 18% to about 50% of the lamp power.

8. A method as defined in claim 1, wherein said pulses provide approximately the rated power input of said lamp.

* * * * *